(12) United States Patent
Aruga (10) Patent No.: US 8,129,022 B2
(45) Date of Patent: *Mar. 6, 2012

(54) FLUORORESIN FILM AND PROCESS FOR ITS PRODUCTION

(75) Inventor: Hiroshi Aruga, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 12/486,815

(22) Filed: Jun. 18, 2009

(65) Prior Publication Data

US 2009/0263650 A1    Oct. 22, 2009

Related U.S. Application Data

(63) Continuation of application No. PCT/JP2007/074725, filed on Dec. 21, 2007.

(30) Foreign Application Priority Data

Dec. 22, 2006 (JP) ................. 2006-345950

(51) Int. Cl.
*B32B 5/16* (2006.01)
*B32B 18/00* (2006.01)
*B32B 27/20* (2006.01)
*B32B 27/28* (2006.01)
*B32B 27/30* (2006.01)

(52) U.S. Cl. ........ 428/404; 428/323; 428/328; 428/329; 428/331; 428/338; 428/339; 428/402; 428/403; 428/421; 428/422; 427/212; 427/214; 524/413; 524/492; 524/493; 524/497; 106/434; 106/449; 106/482

(58) Field of Classification Search ........................ None
See application file for complete search history.

(56) References Cited

U.S. PATENT DOCUMENTS 4,134,776 A * 1/1979 Rieger et al. .................. 106/417
4,461,810 A * 7/1984 Jacobson ...................... 428/530
(Continued)

FOREIGN PATENT DOCUMENTS

EP    0 654 509    * 5/1995
(Continued)

OTHER PUBLICATIONS

Extended European Search Report issued on Sep. 8, 2011 in the corresponding European Application No. 07851077.3.

*Primary Examiner* — Vivian Chen
(74) *Attorney, Agent, or Firm* — Oblon, Spivak, McClelland, Maier & Neustadt, L.L.P.

(57) ABSTRACT

A fluororesin film, of which discoloration, a change in the visible light transmittance and a decrease in the mechanical strength can be suppressed for a long period of time even though it contains titanium oxide, the fluorescent film having a pigment dispersed in a fluororesin, which pigment are composite particles each comprising a particle containing titanium oxide, a first covering layer containing cerium oxide and a second covering layer containing silicon oxide in this order from the inside, wherein the amount of cerium oxide is from 5 to 30 parts by mass based on 100 parts by mass of titanium oxide, the amount of silicon oxide is from 5 to 60 parts by mass based on 100 parts by mass of titanium oxide, and the average particle size of the composite particles is from 0.15 to 3 µM; and a process for its production.

20 Claims, 2 Drawing Sheets

U.S. PATENT DOCUMENTS

| | | | | |
|---|---|---|---|---|
| 4,494,993 A * | 1/1985 | Bernhard et al. | ............. | 106/417 |
| 4,496,677 A * | 1/1985 | Briggs et al. | ................. | 524/108 |
| 4,537,636 A * | 8/1985 | Bernhard et al. | ............. | 106/417 |
| 4,544,415 A * | 10/1985 | Franz et al. | .................... | 106/417 |
| 4,623,396 A * | 11/1986 | Kimura et al. | ................ | 106/417 |
| 4,797,308 A * | 1/1989 | Mattin | ............................ | 428/15 |
| 5,022,923 A * | 6/1991 | Rau et al. | ...................... | 106/415 |
| 5,116,664 A * | 5/1992 | Kimura et al. | ................ | 428/216 |
| 5,137,575 A * | 8/1992 | Yasuki et al. | ................. | 106/441 |
| 5,560,845 A * | 10/1996 | Birmingham et al. | ... | 219/121.85 |
| 5,750,090 A * | 5/1998 | Yoshida et al. | ................. | 424/59 |
| 5,858,077 A * | 1/1999 | Kayanoki | ................. | 106/287.11 |
| 6,060,135 A | 5/2000 | Service | ........................... | 428/31 |
| 6,635,352 B2 * | 10/2003 | Shirakawa | ................... | 428/447 |
| 6,648,957 B1 * | 11/2003 | Andes et al. | .................. | 106/415 |
| 6,783,584 B2 * | 8/2004 | Takahashi | .................... | 106/403 |
| 7,049,522 B2 * | 5/2006 | Kim et al. | ................. | 174/110 R |
| 7,060,126 B2 * | 6/2006 | Andes et al. | ................... | 106/415 |
| 7,390,842 B2 * | 6/2008 | Kieser et al. | ................... | 523/171 |
| 7,413,599 B2 * | 8/2008 | Henglein et al. | ............. | 106/415 |
| 2010/0015436 A1 * | 1/2010 | Aruga | ........................... | 428/328 |
| 2011/0086209 A1 * | 4/2011 | Katayama et al. | ............ | 428/206 |

FOREIGN PATENT DOCUMENTS

| | | | |
|---|---|---|---|
| EP | 0 905 205 | * | 3/1999 |
| FR | 2 753 980 | | 4/1998 |
| FR | 2753980 | * | 4/1998 |
| JP | 59-184264 | | 10/1984 |
| JP | 03-017011 | * | 1/1991 |
| JP | 07-315838 | | 12/1995 |
| JP | 08-259731 | * | 10/1996 |
| JP | 8-259731 | | 10/1996 |
| JP | 10-292056 | * | 11/1998 |
| JP | 11-292996 | | 10/1999 |

* cited by examiner

Fig. 2

FLUORORESIN FILM AND PROCESS FOR ITS PRODUCTION

RELATED APPLICATIONS

This application is a continuation of PCT/JP07/74725, filed Dec. 21, 2007.

TECHNICAL FIELD

The present invention relates to a fluororesin film containing, as a pigment, composite particles containing titanium oxide, and a process for its production.

BACKGROUND ART

A fluororesin film is excellent in weather resistance, stain resistance, etc. and is therefore used as a roof material, a wall covering material, etc. for agricultural greenhouses or membrane structures (such as outdoor exhibition halls or sports facilities). However, a fluororesin film has a high visible light transmittance and accordingly when it is used as a roof material, a wall covering material or the like, the interior may be too bright or the inside temperature may increase too much, and accordingly it is sometimes required to suppress the visible light transmittance.

As a method of suppressing the visible light transmittance of a fluororesin film, a method of reflecting the visible light and a method of absorbing the visible light may be mentioned. Among them, by the method of absorbing the visible light, the temperature of the fluororesin film tends to increase, whereby mechanical strength will decrease. Accordingly, the method of reflecting the visible light is preferred.

As a method of reflecting the visible light entering the fluororesin film, a method of dispersing in the fluororesin film a white pigment such as a titanium oxide pigment having a high refractive index may be mentioned.

However, a fluororesin film containing a titanium oxide pigment has the following drawbacks.

(i) Titanium oxide is likely to undergo discoloration and decomposition by ultraviolet rays. As a result, the fluororesin film is likely to undergo discoloration or a change in the visible light transmittance.

(ii) The fluororesin film is likely to undergo discoloration or a decrease in mechanical strength by photocatalytic reaction of titanium oxide by ultraviolet rays. As a result, the fluororesin film is likely to undergo a change in the visible light transmittance.

(iii) Hydrogen fluoride tends to be generated by decomposition of the fluororesin by photocatalytic reaction of titanium oxide, and another color pigment blended in the coating layer together with the white pigment undergoes discoloration by hydrogen fluoride. As a result, the fluororesin film is likely to undergo discoloration or a change in the visible light transmittance.

As a pigment which overcomes the above problem (i), the following pigment has been proposed.

(1) A pigment which is a pigment comprising cerium oxide and dense amorphous silica precipitated on the surface of rutile-type titanium oxide, having an amount of cerium oxide of from 0.01 to 1.0 mass % of titanium oxide, and an amount of the dense amorphous silica of from 1 to 8 mass % of titanium oxide (Patent Document 1).

(2) A pigment which is a pigment comprising rutile $TiO_2$ particles having a covering comprising alumina or alumina/silica, and which has cerium cations in an amount of from 0.5 to 2 wt % of $TiO_2$ and sulfate anions, phosphate anions or silicate anions in a stoichiometric amount bonded to the particle surface (Patent Document 2).

However, the present inventors consider as follows. That is, with respect to the above pigment (1) or (2), although discoloration and decomposition of the pigment itself by ultraviolet rays are suppressed, the photocatalytic reaction of the pigment is not sufficiently suppressed. Particularly, its use together with a fluororesin is not considered, countermeasures against hydrogen fluoride are not taken. Accordingly, the problems (ii) and (iii) are not overcome, and the fluororesin film will undergo discoloration, a change in the visible light transmittance and a decrease in mechanical strength.

Patent Document 1: JP-A-7-315838
Patent Document 2: JP-A-59-184264

DISCLOSURE OF THE INVENTION

Objects to be Accomplished by the Invention

It is an object of the present invention to provide a fluororesin film, of which discoloration, a change in the visible light transmittance and a decrease in mechanical strength can be suppressed for a long period of time even though it contains titanium oxide, and a process for its production.

Means to Accomplish the Objects

The present invention provides a fluororesin film comprising a fluororesin and the following composite particles dispersed in the fluororesin:
Composite particles: composite particles each comprising a particle containing titanium oxide, a first covering layer containing cerium oxide and a second covering layer containing silicon oxide in this order from the inside, wherein the amount of cerium oxide is from 5 to 30 parts by mass based on 100 parts by mass of titanium oxide, the amount of silicon oxide is from 5 to 60 parts by mass based on 100 parts by mass of titanium oxide, and the average particle size of the composite particles is from 0.15 to 3 µm.

The concentration of the composite particles is preferably at most 20 mass % in the fluororesin (100 mass %).

The fluororesin film of the present invention preferably has a visible light transmittance of from 20 to 75% as measured in accordance with JIS R3106.

Further, the present invention provides a process for producing the above fluororesin film, which comprises surface-treating the surface of the composite particles with a surface covering agent to adjust the methanol hydrophobizing degree, kneading the surface-treated composite particles and the fluororesin to obtain a resin composition, and forming the resin composition into a film-form.

Further, the present invention provides a process for producing the above fluororesin film, which comprises kneading the composite particles, the fluororesin and a metal soap to obtain a resin composition, and forming the resin composition into a film-form.

Effects of the Invention

Of the fluororesin film of the present invention, discoloration, a change in the visible light transmittance and a decrease in the mechanical strength can be suppressed for a long period of time even though it contains titanium oxide.

According to the process for producing the fluororesin film of the present invention, agglomeration of the composite particles in the fluororesin film can be suppressed.

BEST MODE FOR CARRYING OUT THE INVENTION (Fluororesin Film)

The fluororesin film of the present invention is a film having specific composite particles dispersed as a pigment in a fluororesin.

<Composite Particles>

The composite particles of the present invention are composite particles each comprising a particle containing titanium oxide, a first covering layer containing cerium oxide and a second covering layer containing silicon oxide in this order from the inside.

The average particle size of the composite particles is from 0.15 to 3 µm, preferably from 0.2 to 2 µm. When the average particle size of the composite particles is at least 0.15 µm, they can sufficiently reflect visible light as different from composite particles (average particle size: at most 0.1 µm) for cosmetics which are required to have transparency. When the average particle size of the composite particles is at most 3 µm, a smooth coating layer can be formed. The average particle size of the composite particles is from about 1.1 to about 10 times the average particle size of the particles containing titanium oxide to be used as the core.

The average particle size of the composite particles is measured by using a scanning electron microscope (SEM). As the measuring method, the composite particles of the present invention are put, for example, in an alcohol such as isopropanol to adjust the solid content concentration to be about 0.1 mass %, and the composite particles were completely dispersed by ultrasonic waves, dropped on a collodion film and dried, whereupon SEM observation is carried out. In the present invention, the particle size is the particle diameter of particles observed, and the average particle size is defined as the average value of 20 randomly sampled particles in the SEM image. In the present invention, the average particle size is calculated by this method.

(Particles Containing Titanium Oxide)

The composite particles are required to sufficiently reflect visible light. Accordingly, as the core, particles containing titanium oxide having a high refractive index are used. As disclosed in JP-A-10-292056, if silicon oxide particles (e.g. silica, talc or mica) having a low refractive index are used as the core, visible light can not sufficiently be reflected, and accordingly a large amount of composite particles will be required so as to suppress the visible light transmittance of the fluororesin film.

The particles containing titanium oxide may, for example, be a titanium oxide particles, mica covered with titanium oxide or a pigment of a composite oxide containing titanium oxide. Among them, preferred is a titanium oxide pigment in view of reflection of visible light, and more preferred is a titanium oxide pigment having high sphericity.

The composite oxide containing titanium oxide may, for example, be CrSbTi oxide (orange), FeAlTi oxide (orange), NiSbTi oxide (lemon), NiCoZnTi oxide (green) or MnSbTi oxide (brown). Further, the pigment of such a composite oxide may, for example, be a yellow pigment (titanium yellow, chrome yellow, etc.) a green pigment (cobalt zinc titanium), etc.) or a brown pigment (manganese brown, etc.).

The composite oxide containing titanium oxide also undergoes discoloration and decomposition by ultraviolet rays and exhibits photocatalytic reaction. Accordingly, a particle of the composite oxide is covered with a first covering layer containing cerium oxide and a second covering layer containing silicon oxide, whereby composite particles of which discoloration and decomposition by ultraviolet rays and photocatalytic reaction are suppressed, which are excellent in resistance against hydrogen fluoride and which have a color intrinsic to the particles of the composite oxide used as the core will be obtained.

The average particle size of the particles containing titanium oxide is preferably from 0.1 to 2 µm, more preferably from 0.2 to 1 µm. When the average particle size of the particles containing titanium oxide is at least 0.1 µm, visible light can sufficiently be reflected as different from a titanium oxide pigment (average particle size: at most 0.05 µm) for cosmetics which is required to have transparency. When the average particle size of the particles containing titanium oxide is at most 2 µm, a thin fluororesin film having a thickness of at most 50 µm can be formed.

The average particle size of the particles containing titanium oxide is preferably calculated and determined by the same method as that for the composite particles of the present invention.

(First Covering Layer)

The first covering layer is a layer containing cerium oxide. Since cerium oxide has high ultraviolet shielding performance, the first covering layer can decrease ultraviolet rays which reach the particles containing titanium oxide.

The first covering layer may be a layer consisting of cerium oxide alone or may be a layer comprising a composite of cerium oxide with another metal oxide. The first covering layer is preferably a layer comprising cerium oxide alone in view of high ultraviolet shielding performance.

Also in a case where a second covering layer alone is formed without forming the first covering layer, deterioration of the fluororesin film by photocatalytic reaction can be suppressed to a certain extent since the particles containing titanium oxide and the fluororesin are not in contact with each other. However, the effect of suppressing deterioration of the fluororesin film is low as compared with a case where the first covering layer and the second covering layer are formed. That is, it is shown that to suppress deterioration of the fluororesin film, it is more effective to decrease ultraviolet rays which reach the particles containing titanium oxide rather than to prevent the particles containing titanium oxide from being in contact with the fluororesin.

The amount of cerium oxide contained in the first covering layer is from 5 to 30 parts by mass, preferably from 8 to 20 parts by mass, based on 100 parts by mass of titanium oxide contained in the particles containing titanium oxide. When the amount of cerium oxide based on 100 parts by mass of titanium oxide is at least 5 parts by mass, the ultraviolet shielding performance will sufficiently be high. When the amount of cerium oxide based on 100 parts by mass of titanium oxide is at most 30 parts by mass, yellowness specific to cerium oxide can be suppressed, whereby the color intrinsic to particles containing titanium oxide used as the core can be reproduced. Further, the first covering layer is not too thick, whereby the decrease in adhesion to the particles containing titanium oxide can be suppressed, whereby the first covering layer and the second covering layer are less likely to be peeled off when the fluororesin film is prepared. The pigment as disclosed in Patent Document 1 has insufficient ultraviolet shielding performance since the amount of cerium oxide is extremely small, and the photocatalytic reaction of the pigment is not sufficiently suppressed.

(Second Covering Layer)

The second covering layer is a layer containing silicon oxide. Silicon oxide weakens the yellowness of cerium oxide, and accordingly the color intrinsic to the particles containing titanium oxide used as the core can be reproduced.

Further, although silicon oxide has weak ultraviolet shielding performance as compared with cerium oxide, it has high resistance against hydrogen fluoride generated from the fluororesin as compared with cerium oxide. Thus, the second covering layer protects the first covering layer containing cerium oxide from hydrogen fluoride and suppresses the decrease in ultraviolet shielding performance of the first covering layer.

The mechanism of the decrease in ultraviolet shielding performance of the first covering layer by hydrogen fluoride is as follows.

From the fluororesin, hydrogen fluoride is generated from the following reasons.

(I) At the time of kneading the fluororesin and the composite particles or at the time of forming a fluororesin film, hydrogen fluoride is generated by heat-decomposition of the fluororesin.

(II) When the fluororesin film is exposed to solar light, hydrogen fluoride is generated by photodecomposition of the fluororesin.

(III) If titanium oxide which is not sufficiently covered exists, hydrogen fluoride is generated by decomposition of the fluororesin by photocatalytic reaction of the titanium oxide. If cerium oxide is reacted with hydrogen fluoride, it becomes cerium fluoride having low ultraviolet shielding performance, whereby the ultraviolet shielding performance of the first covering layer decreases.

The second covering layer may be a layer comprising silicon oxide alone or may be a layer comprising a composite oxide of silicon oxide with another metal oxide. Such another metal oxide may, for example, be zirconium oxide or aluminum oxide. The second covering layer is preferably a layer comprising silicon oxide alone or a layer comprising silicon oxide as the main component in view of high resistance against hydrogen fluoride.

Silicon oxide may be non-style silica or crystalline silica. The non-style silica is amorphous silica having no crystallinity.

The amount of silicon oxide contained in the second covering layer is from 5 to 60 parts by mass, preferably from 10 to 30 parts by mass, based on 100 parts by mass of titanium oxide contained in the particles containing titanium oxide. When the amount of silicon oxide is at least 5 parts by mass based on 100 parts by mass of titanium oxide, the first covering layer containing cerium oxide can sufficiently be protected from hydrogen fluoride. When the amount of silicon oxide is at most 60 parts by mass based on 100 parts by mass of titanium oxide, the second covering layer is not too thick, whereby the second covering layer is less likely to be peeled off when the fluororesin film is prepared. Further, since the decrease in the refractive index of the composite particles is suppressed, the amount of the composite particles required to suppress the visible light transmittance of the resin film can be decreased. With respect to the pigment disclosed in Patent Document 1, since its use with a fluororesin is not assumed, the amount of dense amorphous silica is relatively small, whereby cerium oxide cannot sufficiently be protected from hydrogen fluoride in some cases.

The amount of silicon oxide contained in the second covering layer is preferably from 50 to 300 parts by mass, more preferably from 100 to 200 parts by mass, based on 100 parts by mass of cerium oxide contained in the first covering layer. When the amount of silicon oxide is at least 50 parts by mass based on 100 parts by mass of cerium oxide, the first covering layer containing cerium oxide can sufficiently be protected from hydrogen fluoride. When the amount of silicon oxide is at most 300 parts by mass based on 100 parts by mass of cerium oxide, the second covering layer is not too thick, whereby the second covering layer is less likely to be peeled off when the fluororesin film is prepared. Further, since the decrease in the refractive index of the composite particles is suppressed, the amount of the composite particles required to suppress the visible light transmittance of the fluororesin film can be decreased.

(Another Layer)

The composite particles may have another layer on at least one of between the particle containing titanium oxide and the first covering layer, between the first covering layer and the second covering layer and outside the second covering layer, as the case requires.

Such another layer may, for example, be an aluminum oxide layer or a surface active agent layer to be formed on the outside of the second covering layer. The aluminum oxide layer or the surface active agent layer is a layer which improves affinity (dispersibility) of the composite particles to the fluororesin. The surface active agent may, for example, be a silicone oil or stearic acid.

(Process for Producing Composite Particles)

The composite particles can be produced by a production process (A) comprising the following steps (a) to (c) or a production process (B) comprising the following steps (d) to (f).

Production Process (A):

(a) A step of depositing an insoluble cerium compound on particles containing titanium oxide to obtain particles covered with the insoluble cerium compound.

(b) A step of forming a second covering layer on the particles covered with the insoluble cerium compound to obtain precursor particles.

(c) A step of firing the precursor particles to convert the insoluble cerium compound to cerium oxide thereby to obtain composite particles.

Production Process (B):

(d) A step of depositing an insoluble cerium compound on particles containing titanium oxide to obtain particles covered with the insoluble cerium compound.

(e) A step of firing the particles covered with the insoluble cerium compound to convert the insoluble cerium compound to cerium oxide thereby to obtain particles covered with cerium oxide.

(f) A step of forming a second covering layer on the particles covered with cerium oxide to obtain composite particles.

Step (a):

The insoluble cerium compound is a cerium compound insoluble in water. The insoluble cerium compound may, for example, be cerium hydroxide, cerium phosphate or cerium carbonate and is preferably cerium hydroxide.

The particles covered with an insoluble cerium compound can be produced, for example, by the following process.

Particles containing titanium oxide are dispersed in water to obtain an aqueous dispersion. An aqueous cerium nitrate solution is dropwise added to the aqueous dispersion while heating the aqueous dispersion. Then, an aqueous sodium hydroxide solution is dropwise added to the aqueous dispersion so that the pH of the aqueous dispersion will be from 7 to 9, whereby cerium hydroxide is deposited on the particles containing titanium oxide. Then, the liquid containing the particles covered with an insoluble cerium compound is subjected to filtration, and the particles covered with an insoluble cerium compound are washed with water and dried.

Step (b):

The second covering layer is formed by hydrolyzing a silicate (such as sodium silicate) or by hydrolyzing an alkoxysilane (such as ethyl silicate).

The precursor particles can be produced, for example, by the following process.

The particles covered with an insoluble cerium compound are dispersed in water by using a dispersing machine, an emulsifying machine or the like to obtain an aqueous dispersion. A silicate solution (e.g. No. 3 sodium silicate) is dropwise added to the aqueous dispersion with stirring, to form a second covering layer on the particles covered with an insoluble cerium compound. The liquid containing the precursor particles is subjected to filtration, and the obtained precursor particles are washed with water and dried.

Step (c):

Since cerium oxide is chemically stabler than the insoluble cerium salt, firing is carried out. The firing temperature is preferably from 200 to 1,000° C., more preferably from 400 to 600° C.

The firing time is preferably from 1 to 3 hours.

Agglomerates of the fired particles are crushed to obtain composite particles.

Step (d):

The step (d) is carried out in the same manner as in the step (a).

Step (e):

Since cerium oxide is chemically stabler than the insoluble cerium salt, firing is carried out. The firing temperature is preferably from 200 to 1,000° C., more preferably from 400 to 600° C.

The firing time is preferably from 1 to 3 hours.

Agglomerates of the fired particles are crushed to obtain particles covered with cerium oxide.

Step (f):

The composite particles can be produced, for example, by the following process.

The particles covered with cerium oxide are dispersed in a water/alcohol mixed dispersion medium to obtain a dispersion. An alkoxysilane (such as ethyl silicate) is added to the dispersion with stirring, followed by hydrolysis to form a second covering layer on the particles covered with cerium oxide. The liquid containing the composite particles is subjected to filtration, and the obtained composite particles are washed with water and dried (and fired as the case requires).

<Fluororesin>

The fluororesin may, for example, be a vinyl fluoride polymer, a vinylidene fluoride polymer, a vinylidene fluoride/hexafluoropropylene copolymer, a tetrafluoroethylene/hexafluoropropylene/vinylidene fluoride copolymer, a tetrafluoroethylene/propylene copolymer, a tetrafluoroethylene/vinylidene fluoride/propylene copolymer, an ethylene/tetrafluoroethylene copolymer (hereinafter referred to as ETFE), a hexafluoropropylene/tetrafluoroethylene copolymer, a perfluoro(alkyl vinyl ether)/tetrafluoroethylene copolymer or tetrafluoroethylene (PTFE).

The fluororesin is preferably ETFE, a hexafluoropropylene/tetrafluoroethylene copolymer, a perfluoro(alkyl vinyl ether)/tetrafluoroethylene copolymer, a tetrafluoroethylene/hexafluoropropylene/vinylidene fluoride copolymer or a vinylidene fluoride polymer in view of good transparency and weather resistance.

<Fluororesin Film>

The content of the composite particles in the fluororesin film may suitably be adjusted so that the visible light transmittance will be at a desired level, taking the thickness of the fluororesin film into consideration. The content of the composite particles is preferably at most 20 mass %, particularly preferably at most 10 mass %, in the fluororesin film (100 mass %). If the content of the composite particles exceeds 20 mass %, the non-tackiness or the stain resistance of the fluororesin film tend to be substantially impaired, such being undesirable. Further, in order to control the visible light transmittance to be at most 70%, the content of the composite particles is preferably at least 0.02 mass %, more preferably at least 0.06 mass %, as a film having a thickness of 500 μm.

The fluororesin film may contain another pigment other than the composite particles. Another pigment may be a coloring pigment such as an organic pigment or an inorganic pigment. Specifically, it may, for example, be carbon black (black pigment), iron oxide (red pigment), aluminum cobalt oxide (blue pigment), copper phthalocyanine (blue pigment, green pigment), perylene (red pigment) or bismuth vanadate (yellow pigment).

The thickness of the fluororesin film is preferably from 5 to 500 μm, more preferably from 20 to 300 μm. If the thickness of the film exceeds 500 μm, the film tends to lack in flexibility and may not meet the requirements for a film design having a curvature, such being undesirable. On the other hand, if the thickness is less than 5 μm, the handling tends to be difficult, and the mechanical strength expected as a structural material may not be satisfied, such being undesirable.

The visible light transmittance of the fluororesin film is preferably from 20 to 75%, more preferably from 30 to 65%. When the visible light transmittance of the fluororesin film is at least 20%, a screen effect can be produced such that the inside is hardly seen in detail while light of at least 1,000 lux as the minimum requirement for human activity in the day time is maintained. Further, an effect of lowering the temperature in an agricultural greenhouse or in a membrane structure can be obtained.

Further, when the visible light transmittance of the resin film is at most 75%, too much increase in the room temperature in an agricultural greenhouse or in a membrane structure can be prevented. A fluororesin film having a visible light transmittance exceeding 75% has no substantial effect of improving thermal environment such as a decrease in the indoor temperature even though a design feature may be thereby imparted.

The visible light transmittance of the fluororesin film is measured in accordance with "Testing method on transmittance, reflectance and emittance of flat glasses and evaluation of solar heat gain coefficient" as stipulated by JIS R3106.

(Process for Producing Fluororesin Film)

The fluororesin film may, for example, be produced by kneading a fluororesin and the composite particles to form a resin composition and forming the resin composition into a film-form by a known forming method.

In order to suppress agglomeration of the composite particles during the kneading, it is preferred to adopt the following method (x) or (y).

(x): A method of preliminarily surface-treating the surface of the composite particles with a surface covering agent to adjust the methanol hydrophobizing degree.

(y): A method of adding a metal soap represented by a stearic acid salt to the fluororesin together with the composite particles during the kneading.

Method (x):

The surface covering agent is one which can be firmly bond to the surface of the composite particles and can increase the hydrophobizing degree. The surface covering agent is preferably a reactive silicon compound having a hydroxyl group or a hydrolyzable group directly bonded to a silicon atom, more preferably an organic silicon compound having a hydroxyl group or a hydrolyzable group and having a hydrophobic organic group bonded to a silicon atom by a carbon-silicon bond.

The hydrolyzable group may, for example, be an alkoxy group, an acyloxy group, an amino group, an isocyanate group or a chlorine atom. Among them, an alkoxy group having at most 4 carbon atoms is preferred, and a methoxy group or an ethoxy group is more preferred. It is preferred that from 1 to 4 hydrolyzable groups, more preferably from 2 to 3 hydrolyzable groups, are bonded to a silicon atom.

The hydrophobic organic group is preferably a hydrocarbon group having no reactive functional group or no hydrophilic group, or a fluorinated hydrocarbon group. Here, a usual silane coupling agent wherein an organic group having a highly hydrophilic reactive functional group (such as an epoxy group or an amino group) is bonded to a silicon atom, is not suitable as the surface covering agent.

The hydrocarbon group and fluorinated hydrocarbon group may, for example, be an alkyl group, an alkenyl group, an aryl group, an aralkyl group, a fluoroalkyl group or a fluoroaryl group. Among them, a $C_{2-20}$ alkyl group, a $C_{2-20}$ fluoroalkyl group having at least one fluorine atom, or a phenyl group (which may be substituted by an alkyl group or a fluoroalkyl group) may, for example, be preferred.

The organic silicon compound may be an organosilicone compound having a hydroxyl group or hydrolyzable group directly bonded to a silicon atom. The organic group in such an organosilicone compound is preferably an alkyl group having at most 4 carbon atoms or a phenyl group. The organosilicone compound may, for example, be silicone oil.

The following compounds may, for example, be mentioned as specific examples of the organic silicon compound.

Tetraalkoxysilanes: tetraethoxysilane, tetramethoxysilane, etc., trialkoxysilanes: isobutyltrimethoxysilane, hexyltrimethoxysilane, (3,3,3-trifluoropropyl)trimethoxysilane, etc., silicone oils: dimethyl silicone oil, methyl hydrogen silicone oil, phenyl methyl silicone oil, etc.

Among them, isobutyltrimethoxysilane, hexyltrimethoxysilane or dimethyl silicone oil is preferred.

The amount of the surface covering agent is in proportion to the size of the specific area of the composite particles. If the amount of the surface covering agent is small, the composite particles are likely to undergo a color change to black or brown during the kneading. If the amount of the surface covering agent is large, the agglomerates of the surface covering agent tend to form hard spots, whereby the appearance of the fluororesin film may thereby be deteriorated.

The amount of the surface covering agent is suitably adjusted so that the methanol hydrophobizing degree will be at a desired level.

The methanol hydrophobizing degree of the surface-treated composite particles is preferably from 40 to 75%, more preferably from 60 to 70%. When the methanol hydrophobizing degree of the composite particles is at least 40%, the dispersibility in the fluororesin will be good, and coloration of the fluororesin can be suppressed.

A preferred methanol hydrophobizing degree of the composite particles varies to some extent depending upon the type of the fluororesin.

In a case where the fluororesin is ETFE, the methanol hydrophobizing degree of the composite particles is preferably from 40 to 70%.

In a case where the fluororesin is a hexafluoropropylene/tetrafluoroethylene copolymer or a perfluoro(alkyl vinyl ether)/tetrafluoroethylene copolymer, the methanol hydrophobizing degree of the composite particles is preferably from 60 to 75%.

In a case where the fluororesin is a tetrafluoroethylene/hexafluoropropylene/vinylidene fluoride copolymer, the methanol hydrophobizing degree of the composite particles is preferably from 40 to 70%.

The methanol hydrophobizing degree is an index showing the hydrophobicity of the composite particles. The methanol hydrophobizing degree is measured by the following method.

Into a 300 mL beaker, 50 mL of distilled water is put, and while the distilled water is thoroughly stirred, 5 g of the composite particles are added. If the composite particles are uniformly dispersed in distilled water, such composite particles are well compatible with distilled water, and the methanol hydrophobizing degree is 0%. In a case where the composite particles are not uniformly dispersed in distilled water, methanol is gradually dropwise added to the distilled water. The methanol hydrophobizing degree D (unit: %) is obtained by the following formula from the total amount M (unit: mL) of methanol added until the composite particles are uniformly dispersed in the methanol aqueous solution.

$$D=100M/(M+50)$$

Method (y):

The metal soap may, for example, be a stearic acid salt (such as lithium stearate or zinc stearate).

The stearic acid salt is preferred, since it is selectively coordinated to the composite particles when the composite particles and the fluororesin are kneaded, and thus serves as a surfactant. It is thereby possible to improve the wettability of the highly hydrophilic composite particles with the highly hydrophobic fluororesin during the kneading, whereby the composite particles can be blended with good dispersibility without agglomeration.

When the metal soap is to be employed, the amount of the metal soap is preferably from 0.1 to 10 parts by mass, more preferably from 0.5 to 2 parts by mass, per 100 parts by mass of the composite particles.

With the fluororesin film of the present invention as described above, discoloration, decomposition and photocatalytic reaction by ultraviolet rays can be suppressed, and specific composite particles excellent in durability to hydrogen fluoride are contained as a pigment, whereby discoloration, a change in the visible light transmittance and a decrease in the mechanical strength can be suppressed for a long period of time even though it contains titanium oxide.

EXAMPLES

Now, the present invention will be described in further detail with reference to Examples. However, it should be understood that the present invention is by no means restricted thereto.

Examples 1 is a Reference Example, Examples 2 to 7 are Working Examples of the present invention, and Examples 8 to 12 are Comparative Examples.

(Contents of Titanium Oxide, Cerium Oxide and Silicon Oxide)

The contents of titanium oxide, cerium oxide and silicon oxide were determined by using SEM-EDX integration system S-3400NX manufactured by Hitachi, Ltd.

(Average Particle Size of Composite Particles)

The obtained composite particles were put in isopropanol to a solid content concentration of about 0.1 mass %, and then the composite particles were completely dispersed by ultrasonic waves. Then, the dispersion was dropped on a collodion film and dried, whereupon the SEM observation was carried out using a scanning electron microscope (SEM-EDX integration system S-3400NX manufactured by Hitachi, Ltd.). The average of diameters of 20 particles randomly selected in the obtained SEM image was regarded as the average particle size.

(Visible Light Transmittance)

The visible light transmittance of the fluororesin film was measured by using a spectrophotometer (UV-3100PC manufactured by Shimadzu Corporation) in accordance with "Testing method on transmittance, reflectance and emittance of flat glasses and evaluation of solar heat gain coefficient" as stipulated in JIS R3106.

(Haze)

The haze of the fluororesin film was measured using Haze Computer HZ-2 (manufactured by Suga Test Instruments Co., Ltd.) in accordance with JIS K7136 "Method for obtaining haze of plastics/transparent materials".

(Accelerated Weathering Test)

An accelerated weathering test for 5,000 hours was carried out by using a sunshine weather meter (300 Sunshine weather meter manufactured by Suga Test Instruments Co., Ltd.) equipped with an open frame carbon arc lamp in compliance with JIS K7350-4. After the accelerated weathering test, the visible light transmittance and haze of the fluororesin film were measured.

Changes in the visible light transmittance and haze of the fluororesin film after the accelerated weathering test will serve also as indices for discoloration and a decrease in the mechanical strength of the fluororesin film.

Particularly, by measuring the change in the haze, a fine change formed at the initiation of the photocatalytic reaction of titanium oxide can be observed.

That is, in the measurement of the visible light transmittance, light emitted from a light source will pass through the film, whereby the intensity of light for every wavelength is measured, and the total light transmittance as a sum of rectilinear light and diffuse light is measured. Therefore, it is not possible to observe a fine change at the initiation of the photocatalytic reaction of titanium oxide (fine voids formed by decomposition of the fluororesin film by the photocatalytic reaction). That is, even if light undergoes diffuse reflection by such voids and diffuse light increases within the fluororesin film, the entire light transmittance will not change in a case where rectilinear light decreases to compensate the increase of the diffuse light. Accordingly, it is effective to measure the haze whereby the increase of the diffuse light can thereby be observed.

Example 1

An ETFE film having a thickness of 200 μm and having no pigment (no composite particles) added, was prepared.

Figure 1:
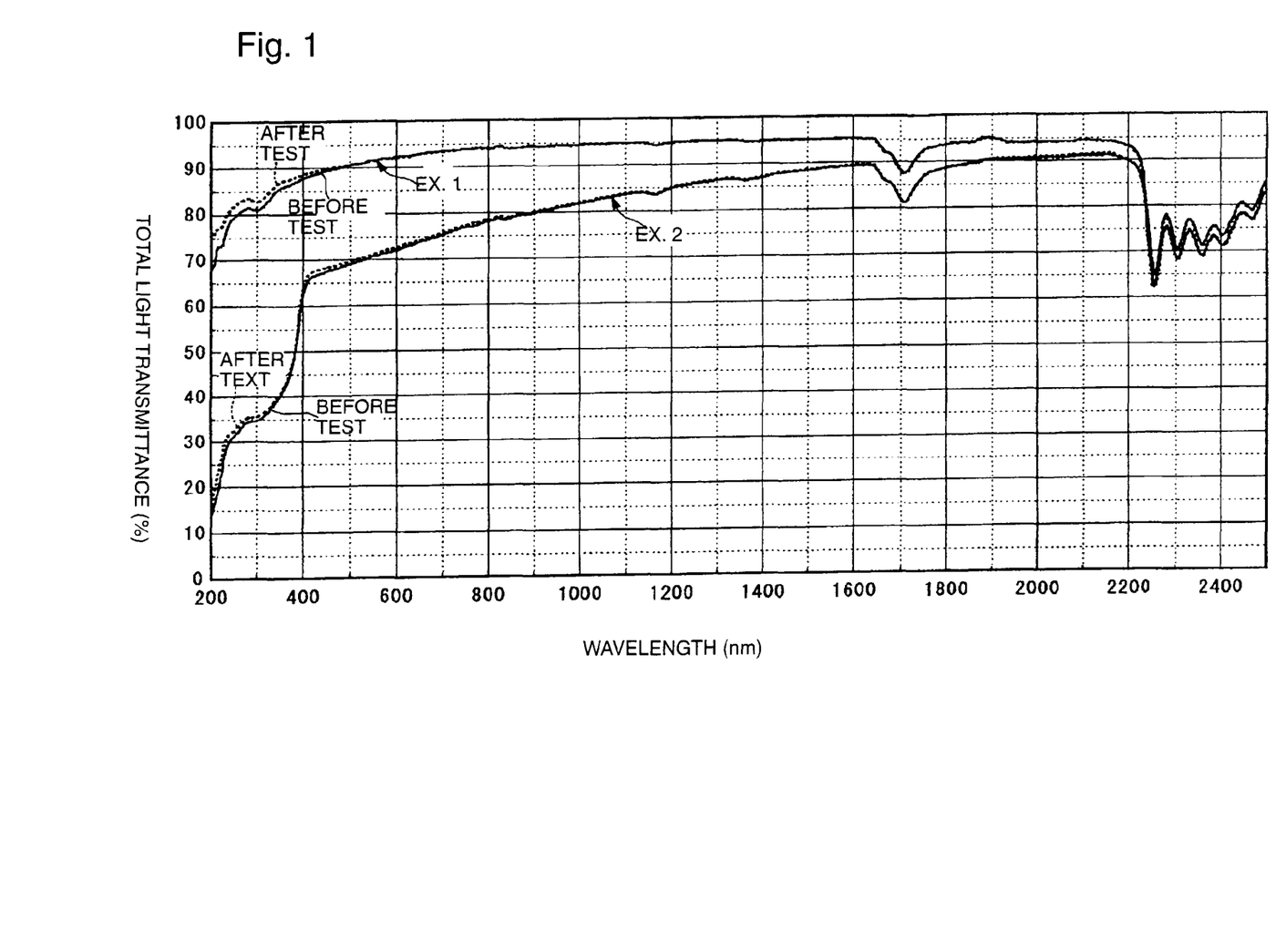
FIG. 1 is an optical chart of the fluororesin films in Examples 1 and 2 before and after the respective accelerated weathering tests.

The visible light transmittance and haze of the ETFE film were measured before and after the accelerated weathering test. The visible light transmittance before and after the accelerated weathering test was 91.5% in each case, and the haze was 6.5% in each case. The optical characteristics did not change. The optical chart of the ETFE film before and after the accelerated weathering test is shown in FIG. 1.

Example 2

Preparation of Composite Particles 500 g of a titanium oxide pigment (manufactured by Ishihara Sangyo Kaisha, Ltd., CR50, average particle size: 0.20 μm) was added to 10 liters of pure water and dispersed by a Disperse Mill (manufactured by Hosokawa Micron Corporation) for 1 hour to obtain an aqueous dispersion. While the aqueous dispersion was heated at 80° C. and stirred, 264 g of an aqueous cerium nitrate solution (cerium content: 19 mass % as calculated as $CeO_2$) was dropwise added to the aqueous dispersion. A sodium hydroxide solution (5 mass % aqueous solution) was added to the aqueous solution to neutralize the dispersion to have a pH of from 7 to 9 so that cerium hydroxide was deposited on the surface of the titanium oxide pigment. The liquid containing the particles covered with cerium hydroxide was subjected to filtration, and the obtained particles covered with cerium hydroxide were washed with water and dried. Agglomerates of the particles covered with cerium hydroxide were ground to obtain particles covered with cerium hydroxide.

The particles covered with cerium hydroxide were added to 10 liters of pure water and dispersed by a Disperse Mill for 1 hour to obtain an aqueous dispersion. While the aqueous dispersion was heated at 80° C. and stirred, 348 g of No. 3 sodium silicate (silicon content: 28.5 mass % as calculated as $SiO_2$) was added to the aqueous dispersion. At that time, diluted sulfuric acid (2N aqueous solution) was also added to keep the pH of the liquid to from 9 to 11, and stirring was continued further for 1 hour. Then, diluted sulfuric acid (2N aqueous solution) was added to adjust the liquid to have a pH of from 6 to 8 to form a second covering layer on the particle covered with cerium hydroxide. The liquid containing precursor particles was subjected to filtration, and the obtained precursor particles were washed with water and dried. Agglomerates of the precursor particles were ground to obtain precursor particles.

The precursor particles were fired at a temperature of 500° C. for 2 hours, to obtain composite particles. In the composite particles, the content of titanium oxide was 72 mass %, the content of cerium oxide was 10 mass % and the content of silicon oxide was 18 mass %. Accordingly, the amount of cerium oxide was 13.9 parts by mass based on 100 parts by mass of titanium oxide, and the amount of silicon oxide was 25.0 parts by mass based on 100 parts by mass of titanium oxide.

200 g of the composite particles were put into a small size Henschel mixer, and then 100 g of a solution having 14 g of isobutyltrimethoxysilane dissolved in water/methanol=1/9 (mass ratio) was slowly added, followed by stirring for 10 minutes. The wet particles were dried at 120° C. for 1 hour and again broken up by a small size Henschel mixer for 2 minutes to obtain surface-treated composite particles. The methanol hydrophobizing degree of the composite particles was 60%, and the average particle size was 0.25 μm.

No change in the average particle size was observed between before and after the hydrophobizing treatment.

Production of Fluororesin Film:

5 g of the surface-treated composite particles and 4 kg of ETFE (Aflon COP88AX, manufactured by Asahi Glass Company, Limited) were dry-mixed by a V-mixer to obtain a mixture. The mixture was charged into a twin screw extruder, kneaded at 320° C. and then pelletized.

The pellets were formed at 320° C. by a T-die system to obtain a fluororesin film having a thickness of 200 μm. The concentration of the composite particles was 0.125 mass % in the fluororesin film (100 mass %).

The visible light transmittance and haze of the fluororesin film before and after the accelerated weathering test were measured. The results are shown in Table 1. Further, the optical chart of the fluororesin film before and after the accelerated weathering test is shown in FIG. 1.

Example 3

A fluororesin film was obtained in the same manner as in Example 2 except that the concentration of the composite particles and the thickness of the fluororesin film were change to the values shown in Table 1.

The visible light transmittance and haze of the fluororesin film before and after the accelerated weathering test were measured. The results are shown in Table 1.

Example 4

Production of Composite Particles

Composite particles not surface-treated, as shown in Table 1, were obtained in the same manner as in Example 2 except that the amounts of the raw materials charged, were changed. The average particle size of the composite particles was 0.22 μm.

Production of Fluororesin Film 10 g of the obtained composite particles, 2 g of zinc stearate and 4 kg of ETFE (Aflon COP88AX, manufactured by Asahi Glass Company, Limited) were dry-mixed by a V-mixer to obtain a mixture. The mixture was charged into a twin screw extruder, kneaded at 320° C. and then pelletized.

The pellets were formed at 320° C. by a T-die system to obtain a fluororesin film having a thickness of 200 μm. The concentration of the composite particles was 0.29 mass % in the fluororesin film (100 mass %).

The visible light transmittance and haze of the fluororesin film before and after the accelerated weathering test were measured. The results are shown in Table 1.

Examples 5 and 6

Surface-treated composite particles shown in Table 1 were obtained in the same manner as in Example 2 except that the amounts of the raw materials charged were changed.

A fluororesin film was obtained in the same manner as in Example 2 except that the composite particles were employed.

The visible light transmittance and haze of the fluororesin film before and after the accelerated weathering test were measured. The results are shown in Table 1.

Example 7

Surface-treated composite particles shown in Table 1 were obtained in the same manner as in Example 2 except that the amounts of the raw materials charged were changed.

A fluororesin film was obtained in the same manner as in Example 2 except that using the composite particles, the concentration of the composite particles was changed to the value shown in Table 1.

The visible light transmittance and haze of the fluororesin film before and after the accelerated weathering test were measured. The results are shown in Table 1.

Example 8

A titanium oxide pigment (manufactured by Ishihara Sangyo Kaisha, Ltd., CR50, average particle size: 0.20 μm) was subjected to surface treatment in the same manner as in Example 2 to obtain a surface-treated pigment.

A fluororesin film was obtained in the same manner as in Example 2 except that using the pigment instead of the composite particles, the concentration of the pigment and the thickness of the fluororesin film were changed to the values shown in Table 1.

Figure 2:
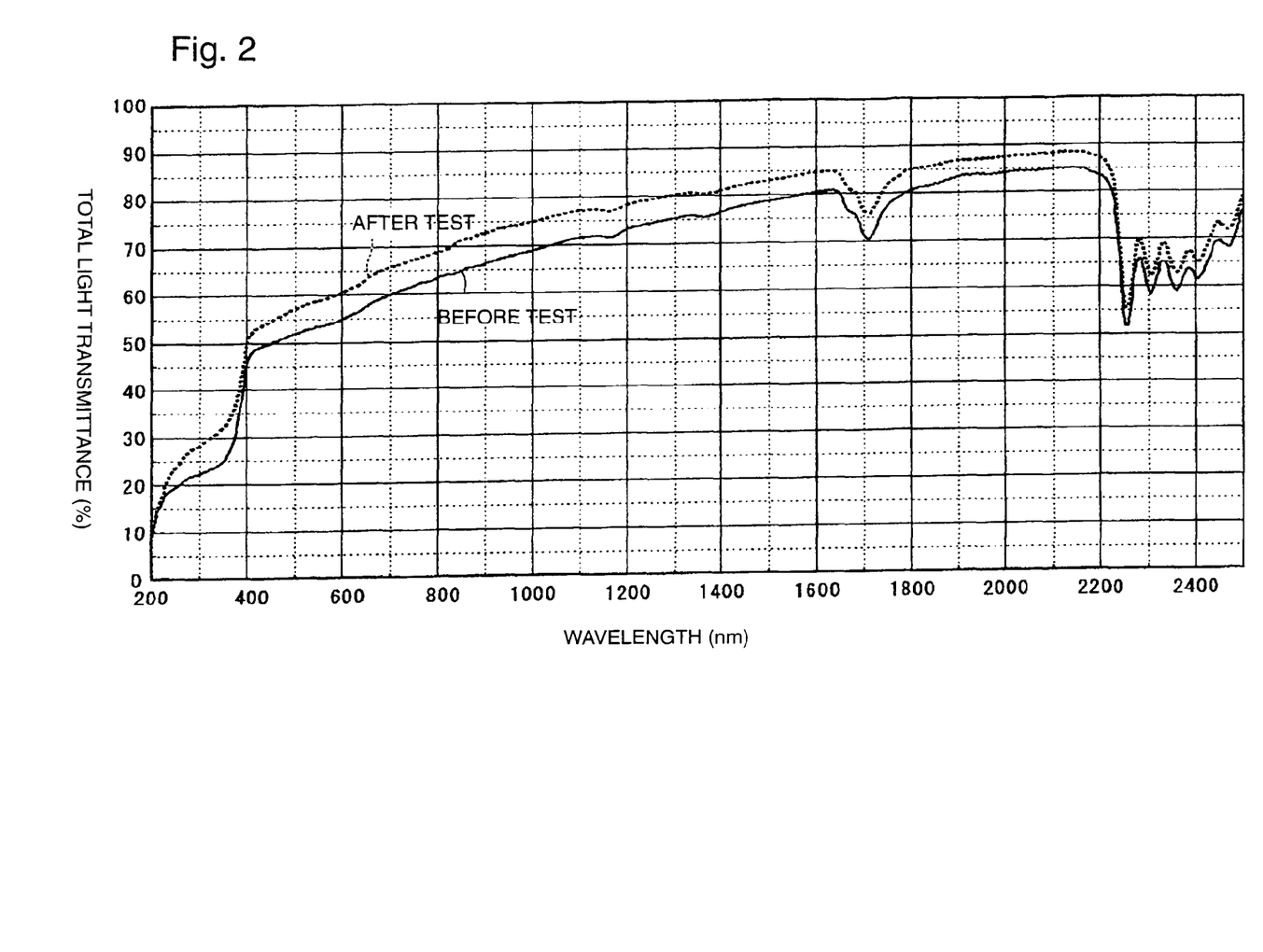
FIG. 2 is an optical chart of the fluororesin film in Example 8 before and after the accelerated weathering test.

The visible light transmittance and haze of the fluororesin film before and after the accelerated weathering test were measured. The results are shown in Table 1. Further, the optical chart of the fluororesin film before and after the accelerated weathering test is shown in FIG. 2.

Example 9

Surface-treated composite particles shown in Table 1 were obtained in the same manner as in Example 2 except that the amounts of the raw materials charged were changed.

A fluororesin film was obtained in the same manner as in Example 2 except that using the composite particles, the concentration of the composite particles and the thickness of the fluororesin were changed to the values shown in Table 1.

The color of the fluororesin film became creamy, which was not practically useful. No measurement of the visible light transmittance and haze was carried out.

Examples 10, 11 and 12

Surface-treated composite particles shown in Table 1 were obtained in the same manner as in Example 2 except that the amounts of the raw materials charged were changed.

A fluororesin film was obtained in the same manner as in Example 2 except that using the composite particles, the concentration of the composite particles was changed to the value shown in Table 1.

The visible light transmittance and haze of the fluororesin film before and after the accelerated weathering test were measured. The results are shown in Table 1.

TABLE 1

| | Composite particles | | | | | | | Fluororesin film | | | | | |
| | | | | | | | | Concentration | | Accelerated weathering test | | | |
| | | | | | | | Average | of composite | | Transmittance (%) | | Haze (%) | |
| | mass % | | | parts by mass | | | particle | particles | Thickness | Before | After | Before | After |
| | $TiO_2$ | $CeO_2$ | $SiO_2$ | $TiO_2$ | $CeO_2$ | $SiO_2$ | size μm | mass % | μm | test | test | test | test |
| Ex. 2 | 72 | 10 | 18 | 100 | 13.9 | 25.0 | 0.25 | 0.125 | 200 | 70.7 | 71.4 | 64.4 | 64.1 |
| Ex. 3 | 72 | 10 | 18 | 100 | 13.9 | 25.0 | 0.25 | 5 | 37 | 33.3 | 33.5 | 91.6 | 91.6 |
| Ex. 4 | 77 | 5 | 18 | 100 | 6.5 | 23.4 | 0.22 | 0.29 | 200 | 51.0 | 52.0 | 89.2 | 88.7 |
| Ex. 5 | 85 | 5 | 10 | 100 | 5.9 | 11.8 | 0.26 | 0.125 | 200 | 60.9 | 61.5 | 77.1 | 76.0 |

TABLE 1-continued

| | Composite particles | | | | | | | Fluororesin film | | | | | |
|---|---|---|---|---|---|---|---|---|---|---|---|---|---|
| | mass % | | | parts by mass | | | Average particle | Concentration of composite particles | Thickness | Accelerated weathering test | | | |
| | | | | | | | | | | Transmittance (%) | | Haze (%) | |
| | | | | | | | | | | Before | After | Before | After |
| | TiO₂ | CeO₂ | SiO₂ | TiO₂ | CeO₂ | SiO₂ | size μm | mass % | μm | test | test | test | test |
| Ex. 6 | 70 | 20 | 10 | 100 | 28.6 | 14.3 | 0.28 | 0.125 | 200 | 66.8 | 68.0 | 68.0 | 67.0 |
| Ex. 7 | 60 | 5 | 35 | 100 | 8.3 | 58.3 | 1.25 | 0.3 | 200 | 56.0 | 56.7 | 81.0 | 80.0 |
| Ex. 8 | 100 | 0 | 0 | 100 | 0 | 0 | 0.20 | 0.1 | 250 | 59.2 | 53.6 | 67.0 | 88.2 |
| Ex. 9 | 50 | 20 | 30 | 100 | 40.0 | 60.0 | 1.90 | 3 | 40 | — | — | — | — |
| Ex. 10 | 80 | 2 | 18 | 100 | 2.5 | 22.5 | 0.25 | 0.125 | 200 | 67.3 | 60.2 | 70.2 | 77.3 |
| Ex. 11 | 70 | 0 | 30 | 100 | 0 | 42.9 | 0.45 | 0.1 | 200 | 73.0 | 64.0 | 67.0 | 77.0 |
| Ex. 12 | 85 | 13 | 2 | 100 | 15.2 | 2.4 | 0.30 | 0.125 | 200 | 62.2 | 59.0 | 72.1 | 77.1 |

Transmittance in Table: Visible light transmittance

Each of the fluororesin films in Examples 1 to 7 showed little change in the visible light transmittance and haze of the fluororesin film between before and after the accelerated weathering test.

Further, with some of the fluororesin films, the visible light transmittance increased by 1% at the maximum, and the haze decreased by about 1%, and the reason is considered to be as follows.

The transparency (the visible light transmittance) of a fluororesin film is determined by the crystallinity and crystal size of the resin. The larger the crystallinity, or larger the crystal size, the lower the transparency and the lower the visible light transmittance. When ETFE is subjected to the weathering test, the crystallinity will increase, but its crystal size decreases, whereby the visible light transmittance tends to increase, and the haze tends to decrease, although such changes are as small as within 1%. Accordingly, also in a method of measuring the optical characteristics of an ETFE film containing a pigment, an increase of the visible light transmittance by about 1% and a decrease of the haze are likely to be affected by the influence of the change of the ETFE resin itself.

On the other hand, the sunshine weather meter is a device whereby carbon is burnt to emit light generated by the burning. Therefore, the interior of the device is soiled with "soot" of such carbon. Accordingly, it is difficult to judge whether the reduction in the visible light transmittance by about 1% is attributable to the soiling in the interior of the device or to the change in the optical characteristics of the fluororesin film.

Accordingly, it is proper to judge that with the change in the visible light transmittance and haze by about 1%, the fluororesin film underwent no substantially change.

The fluororesin film in Example 8 is an example wherein a titanium oxide pigment not having a first covering layer and a second covering layer. The visible light transmittance of the fluororesin film decreased by 5.6%, and the haze increased by 21.2%. The fluororesin film distinctly underwent whitening.

The fluororesin film in Example 9 is an example wherein composite particles having a large amount of cerium oxide was used. The color of the fluororesin film was creamy i.e. not white, whereby coloration by cerium oxide was observed.

The fluororesin film in Example 10 is an example wherein composite particles having a small amount of cerium oxide was used. The visible light transmittance of the fluororesin film decreased substantially, and the haze increased substantially.

The fluororesin film in Example 11 is an example wherein composite particles not having the first covering layer were employed. The visible light transmittance of the fluororesin film decreased substantially, and the haze increased substantially.

The fluororesin film in Example 12 is an example wherein composite particles having a small amount of silica were employed. The visible light transmittance of the fluororesin film decreased, and the haze increased substantially.

INDUSTRIAL APPLICABILITY

The fluororesin film of the present invention is useful as a roof material, a wall covering material, etc. for agricultural greenhouses or membrane structures (such as outdoor exhibition halls or sport facilities).

The entire disclosure of Japanese Patent Application No. 2006-345950 filed on Dec. 22, 2006 including specification, claims, drawings and summary is incorporated herein by reference in its entirety.

What is claimed is:

1. A fluororesin film comprising a fluororesin and the following composite particles dispersed in the fluororesin:
   Composite particles: composite particles each comprising a particle comprising titanium oxide, a first covering layer comprising cerium oxide and a second covering layer comprising silicon oxide in this order from the inside, wherein the amount of cerium oxide is from 5 to 30 parts by mass based on 100 parts by mass of titanium oxide, the amount of silicon oxide is from 10 to 60 parts by mass based on 100 parts by mass of titanium oxide, and the average particle size of the composite particles is from 0.15 to 3 μm.

2. The fluororesin film according to claim 1, which has a visible light transmittance of from 20 to 75% as measured in accordance with JIS R3106.

3. The fluororesin according to claim 2, wherein the visible light transmittance is from 30 to 65% as measured in accordance with JIS R3106.

4. The fluororesin film according to claim 1, wherein the content of the composite particles is at most 20 mass % in the fluororesin (100 mass %).

5. The fluororesin according to claim 4, wherein the content of the composite particles is from 0.06 mass percent to 10 mass percent in the fluororesin.

6. A process for producing the fluororesin film as defined in claim 1, which comprises surface-treating the surface of the composite particles with a surface covering agent to adjust the methanol hydrophobizing degree, kneading the surface-treated composite particles and the fluororesin to obtain a resin composition, and forming the resin composition into a film-form.

7. A process for producing the fluororesin film as defined in claim 1, which comprises kneading the composite particles, the fluororesin and a metal soap to obtain a resin composition, and forming the resin composition into a film-form.

8. The fluororesin according to claim 1, wherein the average particle size of the composite particles is from 0.2 to 2 μm.

9. The fluororesin according to claim 1, wherein the titanium oxide in the composite particles is a pigment of a composite oxide comprising titanium oxide.

10. The fluororesin according to claim 1, wherein the first covering layer comprises cerium oxide alone.

11. The fluororesin according to claim 1, wherein the amount of cerium oxide in the first covering layer is from 8 to 20 parts by mass based on 100 parts by mass of titanium oxide.

12. The fluororesin according to claim 1, wherein the second covering layer comprises silicon oxide alone.

13. The fluororesin according to claim 1, wherein the silicon oxide is a crystalline silica.

14. The fluororesin according to claim 1, wherein the amount of silicon oxide in the second covering layer is from 10 to 30 parts by mass based on 100 parts by mass of titanium oxide.

15. The fluororesin according to claim 1, wherein the amount of silicon oxide contained in the second covering layer is 50 to 300 parts by mass, based on 100 parts by mass of cerium oxide contained in the first covering layer.

16. The fluororesin according to claim 1, wherein the amount of silicon oxide contained in the second covering layer is 100 to 200 parts by mass, based on 100 parts by mass of cerium oxide contained in the first covering layer.

17. The fluororesin according to claim 1, wherein the fluororesin is an ethylene/tetrafluoroethylene copolymer.

18. The fluororesin according to claim 1, wherein the fluororesin film has a thickness of from 5 to 500 μm.

19. The fluororesin according to claim 1, wherein the fluororesin film has a thickness of from 20 to 300 μm.

20. A fluororesin film comprising a fluororesin and the following composite particles dispersed in the fluororesin:

Composite particles: composite particles each comprising a particle comprising titanium oxide, a first covering layer comprising cerium oxide and a second covering layer comprising silicon oxide in this order from the inside, and an additional layer comprising aluminum oxide between the titanium oxide and the first covering layer, or between the first covering layer and the second covering layer, or outside the second covering layer, wherein the amount of cerium oxide is from 5 to 30 parts by mass based on 100 parts by mass of titanium oxide, the amount of silicon oxide is from 5 to 60 parts by mass based on 100 parts by mass of titanium oxide, and the average particle size of the composite particles is from 0.15 to 3 μm.

* * * * *